Patented July 19, 1949

2,476,358

UNITED STATES PATENT OFFICE 2,476,358

SOLUBLE COMPOUND OF CHLOROPHYLL AND SYNTHESIS THEREOF

Holton W. Diamond and Robert A. Smith, Dearborn, Mich., assignors to Ford Motor Company, Dearborn, Mich., a corporation of Delaware No Drawing. Application May 9, 1945, Serial No. 592,916

6 Claims. (Cl. 260—314)

The invention concerns formation of chlorophyll derivatives and, more particularly, the derivatives of the metals of mercury, arsenic, antimony and bismuth for medicinal purposes.

It is the object of this invention to form an antiseptic from cholorphyll. Another object of this invention is to provide a stable water-soluble heavy metal chlorophyll derivative to be used either topically or intravenously. Another object of this invention is to convert the insoluble, naturally occurring chlorophyll compound, to a soluble form in which the magnesium atom has been replaced by one of the heavy metals. Still another object of this invention is to provide a new antiseptic known as disodium mercuric chlorophyllide.

It is generally known that chlorophyll can be isolated by various solvent extraction procedures. It can be very easily decomposed by either acid or alkali. The gradual decomposition with acid brings about a "stepwise" breakdown of the chlorophyll molecule in which the various component groups are broken off, not simultaneously, but rather by degrees. Among first steps in the acid degradation process is the removal of the central metallic atom. In the case of the original chlorophyll, it is magnesium. It is for this reason that the final product of the instant invention must not be subjected to an acid reaction, since the attack of the acid will decompose the product so that the central metallic atom will be broken off from the molecule and become a poison to the system. However, alkalies will likewise effect the breakdown of the chlorophyll molecule, but there is an outstanding difference in that the central metallic atom is retained by the molecule until very late in the stepwise degradation process, and therefore does not become free and a poison to the human system. It is therefore imperative that the carrier in any reaction concerning the water-soluble heavy-metal chlorophyllide must be an alkaline solution in which the pH value is at least 7.1 or 7.2, so that the central metallic atom will not be liberated from the molecule.

In the instant application, chlorophyll of types A and B are not differentiated, since they exist in green foliage at a definite ratio, and it is taken for granted that they are likewise extracted in that ratio. Here the type A consists of the chlorophyll having the methyl group, while type B is the chlorophyll having the aldehyde group. There has been recent work in the field of chlorophyll research to indicate that very definitely chlorophyll stimulates growth of granular tissue and is an aid in certain types of healing. Thus, the water-soluble heavy-metal chlorophyllide theoretically has a dual usefulness in promoting healing by means of the parent structure of chlorophyll, and in acting as an antiseptic through its atom of heavy metal.

Disodium mercuric chlorophyllide is a pigment and has a chemical structure very similar to that of hematin, the red pigment which exists in the blood combined with protein as hemoglobin. The similarity of these two pigments gives rise to the theory that disodium mercuric chlorophyllide is superior to various other similar medicinal preparations, of which salvarsan is an excellent example. It is generally known that salvarsan is not effective outside the body. Although salvarsan has a chemical structure very different from hematin, its effectiveness in the blood stream against various organisms, one of which causes syphilis, is believed to be the result of its combining chemically with the protein of the blood. It is reasonable to assume that water-soluble heavy-metal derivatives of chlorophyll, because of their very close resemblance to hematin, would enter into such a combination even more readily.

Moreover, we have found that the chlorophyll derivatives do not attack certain protein materials or cause precipitation thereof. This has been the primary objection to the use of a popular mercurial antiseptic, since it precipitates protein and in doing so becomes insoluble, inert, and ineffective. Neutral and alkaline solutions of disodium mercuric chlorophyllide were found not to precipitate dispersions of either soybean protein or agar-agar at pH values at which the protein exists in the blood stream.

The toxicity of such compounds is dependent upon the stability of the valence bonds of the central metallic atom, and upon the type of element, group or radical to which this atom is attached. Generally speaking, organic mercurials in which one or both of the valence bonds are satisfied by inorganic atoms, groups, or radicals are more toxic to the human organism than those in which both valence bonds are satisfied by organic groups or radicals. In the instance of disodium mercuric chlorophyllide, both valence bonds of the mercury are satisfied by organic radicals in the chlorophyll ring and, furthermore, the mercury atom is tied into the molecule with two additional subsidiary valence bonds, the nature of which is not fully understood.

It is imperative, however, that the sodium mercuric chlorophyllide be administered in a slightly alkaline saline solution, and that the system of the patient be adjusted so as to produce an alkaline condition throughout the blood streams of the various organs. Since the blood stream is normally slightly alkaline, the problem is very simple; however, the problem becomes more complex at the kidneys where there is often a change from the alkaline to the acid side. This, therefore, requires that the diet of the patient be so controlled during the period of administering the medicinal preparation to likewise produce an alkaline condition in the kidneys.

The process of making chlorophyllide may be divided into two portions, of which one is concerned with the extraction and purification of natural chlorophyll and the making of the water soluble chlorophyll, and the other is concerned with the substitution of the metallic atom for the magnesium atom within the chlorophyll ring. The process is comparatively simple, requiring no high vacuum or pressure throughout the synthesis as carried out in the ordinary laboratory procedure in spite of the complexity of the compound.

Though various green foliages may be used for the extraction of chlorophyll, we have found that the best results are obtained whenever the foliage has been quickly dehydrated shortly after being harvested. This retards the decomposition of the chlorophyll. We have found that an alfalfa leaf meal prepared by the preceding procedure to be an excellent source of chlorophyll, is economical, and contains a minimum of fibrous matter.

Though chlorophyll is soluble in various solvents, we prefer to use acetone in about the ratio of one liter of acetone to one kilogram of dehydrated alfalfa meal. This ratio of solvent to meal forms a saturated pasty mass. The mass is pressed by any one of several means to yield the acetone solution of chlorophyll and other naturally occurring pigments. The extractions are repeated from five to eight times. The solution is then filtered to remove fibrous material and concentrated by distillation at atmospheric pressure to saturation.

The oils, fats, and oil-soluble pigments are transferred to aliphatic ketones or ethers, of which we prefer ethyl ether, by the standard method of partition between immiscible solvents, water being used to remove the acetone. This treatment consists of adding to the concentrated solution of the pigments in acetone an approximately equal volume of ethyl ether, thoroughly mixing, and then adding water to obtain layers. Separation of these two layers is easily accomplished by the use of a separatory funnel. The ethyl ether solution of pigments is washed 12-15 times with water and the last traces of water are removed by discarding a small portion of the ethyl ether layer. The formation of layers is facilitated by the addition of one-tenth of 1% of sodium chloride in the first 9-10 washes.

The ethyl ether solution of pigments is then treated with an excess of a saturated alcoholic solution of alkali hydroxide—preferably sodium in methanol or ethanol. In this reaction, the methyl ($CH_3$) and phytyl ($C_{20}H_{39}$) groups are removed from the carboxyl groups of the molecule, and are replaced by atoms of sodium. This reaction is completed at room temperature and pressure in 30-45 minutes. This reaction belongs to a general type of reactions called saponification, and the chlorophyll is said to have been saponified. The saponified chlorophyll can also properly be called sodium salt of chlorophyll. In this reaction the fats and oils present are also saponified and thereby converted to sodium soaps.

The saponified chlorophyll is water-soluble. It is separated from the carotinoids by adding water to the ethyl ether reaction mixture and obtaining layers. The water-soluble, saponified chlorophyll now goes to the water layer and the carotenoids remain in the ethyl ether layer. Separation of the layers is easily accomplished in a separatory funnel. The water layer is washed 8-10 times with clean ethyl ether to remove entrapped carotenoids.

The next step in the preparation of disodium mercuric chlorophyllide consists of removing entrapped droplets of ethyl ether from the water solution of chlorophyll. This is accomplished by distillation under reduced pressure, 20-25 inches of mercury vacuum, at a temperature not greater than 60° C.

The ethyl ether-free water solution of chlorophyll is next treated with dilute acetic acid. This reaction replaces the central metallic atom, magnesium, as well as the sodium atoms on the carboxyl groups of the molecule, with equivalent numbers of hydrogen atoms. This step is accomplished by adding an excess of 50% acetic acid to the water solution of chlorophyll and bringing the mixture to a boil, adding acetic acid if necessary to maintain an acid condition in the reaction mixture, which tends to become neutral on heating, due to the volatilization of acetic acid.

After the acetic acid has reacted with the saponified, water-soluble chlorophyll, the resulting product is called and hereinafter referred to as chlorophytin, being a mixture of two substances called phytochlorin E and phytorhodin G. The acetic acid reaction also converts the soaps present to fatty acids. The chlorophytin and fatty acids together comprise a black tarry semiliquid mass which rises to the top of the reaction mixture as it approaches the boiling point, and is skimmed off into clean cold water acidified with acetic acid, where it solidifies. When all the chlorophytin has been thus removed from the reaction mixture, the acidified cold water in which it is contained is brought to a boil and the tarry chlorophytin-fatty acid mixture once more removed and placed in an additional quantity of clean cold water acidified with acetic acid. This procedure is repeated five to six times to free the chlorophytin-fatty acid mass from inorganic salts.

The next step is the purification of the chlorophytin. This is accomplished by washing the cold tarry mass with clean hydrocarbon solvent—of which hexane is an example—then following with filtration. Hexane dissolves the fatty acids; and the chlorophytin, a crystalline substance with a blue-black luster, is retained on the filter. When dried, this chlorophytin serves as the intermediate for the preparation of any heavy metal derivative.

In the preparation of disodium mercuric chlorophyllide, one gram of chlorophytin is dissolved in from 1000-1500 milliliters of ethanol, acidified with 5-15 milliliters of concentrated or glacial acetic acid. This solution is filtered and treated with two milliliters of a saturated aqueous solution of mercuric acetate, or sufficient mercuric acetate to cause complete reaction. A heavy green precipitate of mercuric chlorophyllin forms and settles to the bottom of the reaction mixture.

After the precipitate has been allowed to settle two hours, the supernatant liquid is siphoned off or decanted. The precipitated pigment is then transferred to an aliphatic ketone—such as ethyl ether—in a separatory funnel, water being used to remove the ethanol. The ethyl ether layer is washed five to six times with water.

The next step in the preparation is the saponification of the precipitated pigment. This is accomplished by adding to the ethyl ether layer, from which the water has been completely removed, a ten per cent excess of sodium hydroxide in methanol or ethanol. This step and all subsequent steps are best done in a darkened or semi-darkened room: water is added to obtain layers. The water layer at this point contains the water-soluble disodium mercuric chlorophyllide. This water solution of disodium mercuric chlorophyllide is neutralized to a pH value of 8.5 with dilute (5%) hydrochloric acid. It is then centrifuged to remove excess mercury, either as the free metal or in the form of its insoluble oxides, and distilled to dryness under reduced pressure—20 to 25 inches of mercury vacuum—at a temperature not greater than 70° C.

I have found that light has an effect upon disodium mercuric chlorophyllide, causing the liberation of mercury or its oxides. This effect in alkaline solutions of disodium mercuric chlorophyllide I have found to be greater at pH values approximating 7.0 and lesser as the pH values rise.

In use, the dry disodium mercuric chlorophyllide should be dissolved in a saline solution, buffered at a pH value above 7.0. The solution should be centrifuged and used for intravenous injection immediately after preparation.

Some changes or modifications may be made in the method or the steps thereof comprising our invention without departing from the spirit of our invention, and it is our intention to cover by our claims such changes as may reasonably be included within the scope thereof.

We claim:

1. A chlorophyll compound having the formula

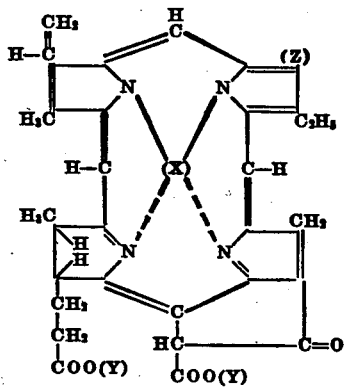

in which Y is an alkaline metal and X is mercury, and Z is selected from the group consisting of methyl and formyl radicals.

2. An antiseptic comprising alkali metal salts of $a$ and $b$ chlorophyll, in which the central metallic atom is Hg.

3. The method of producing disodium mercuric chlorophyllide comprising the steps of extracting plant material containing chlorophyll, fats, oils and carotinoids with acetone, transferring said extract to ethyl ether and removing said acetone with water, saponifying at room temperature said chlorophyll with alcoholic solution of sodium hydroxide, separating said chlorophyll from ethyl ether phase by adding water whereby the fats, oils, and carotinoids are retained in the ethyl ether, reacting said chlorophyll with dilute acetic acid forming chlorophytin, washing said chlorophytin with cold water to remove extraneous salts, washing said chlorophytin with hexane, dissolving said chlorophytin in ethanol acidified with acetic acid, reacting said purified chlorophytin with mercuric acetate forming a precipitate of mercuric chlorophyllin, reacting said precipitate with alcoholic solution of sodium hydroxide to form a water soluble disodium mercuric chlorophyllide.

4. Disodium mercuric chlorophyllide.

5. The method of producing disodium mercuric chlorophyllide comprising the steps of extracting alfalfa meal with acetone, transferring said extract to ethyl ether and mixing said acetone-ethyl-ether solution with water to form layer formations, discarding said water layers, solubilizing by reacting at room temperature said chlorophyll extract with an alcoholic solution of sodium hydroxide, reacting said chlorophyll with acetic acid to displace the Mg atom producing chlorophytin, purifying said chlorophytin first with cold water washings to eliminate organic salts followed with a hydrocarbon solvent wash to eliminate fatty acids, dissolving said purified chlorophytins in ethyl alcohol acidified with acetic acid, reacting said alcoholic solution of chlorophytins with mercuric acetate forming mercuric chlorophyllin, reacting said chlorophyllin with alcoholic solution of sodium hydroxide.

6. The method of producing disodium mercuric chlorophyllide comprising the steps of extracting chlorophyll-containing leafy matter with acetone, mixing said acetone extraction with an aliphatic ether, removing said acetone by adding water and separating the layers, said ether retaining the water insoluble extract, saponifying at room temperature the chlorophyll from said extract with an alcoholic solution of sodium hydroxide, reacting said saponified chlorophyll with acetic acid to form chlorophytin, dissolving said chlorophytin in ethanol, adding mercuric acetate to said chlorophytin solution to produce mercuric chlorophyllin from said ethanol solution and reacting said mercuric chlorophyllin with an alcoholic solution of sodium hydroxide.

HOLTON W. DIAMOND.
ROBERT A. SMITH.

REFERENCES CITED

The following references are of record in the file of this patent:

UNITED STATES PATENTS

| Number | Name | Date |
| --- | --- | --- |
| 2,274,101 | Snyder | Feb. 24, 1942 |
| 2,274,102 | Snyder | Feb. 24, 1942 |